(12) United States Patent
Kitchin (10) Patent No.: US 7,623,496 B2
(45) Date of Patent: Nov. 24, 2009

(54) MANAGING BANDWIDTH IN NETWORK SUPPORTING VARIABLE BIT RATE (75) Inventor: Duncan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2022 days.

(21) Appl. No.: 09/841,657

(22) Filed: Apr. 24, 2001

(65) Prior Publication Data

US 2002/0154656 A1  Oct. 24, 2002

(51) Int. Cl.
*H04Q 7/24* (2006.01)
*H04J 3/16* (2006.01)
(52) U.S. Cl. ................................ 370/338; 370/465
(58) Field of Classification Search .............. 370/468, 370/337, 347, 348, 338, 321, 322, 395.1, 370/420, 473, 465; 455/450, 463, 425
See application file for complete search history.

(56) References Cited

U.S. PATENT DOCUMENTS

| | | | | |
|---|---|---|---|---|
| 5,802,040 A * | 9/1998 | Park et al. | ................... | 370/232 |
| 5,841,777 A * | 11/1998 | Cohen | ........................ | 370/443 |
| 6,009,106 A * | 12/1999 | Rustad et al. | ............... | 370/523 |
| 6,016,311 A * | 1/2000 | Gilbert et al. | ............... | 370/280 |
| 6,031,845 A * | 2/2000 | Walding | ..................... | 370/468 |
| 6,075,792 A * | 6/2000 | Ozluturk | ..................... | 370/441 |
| 6,081,536 A * | 6/2000 | Gorsuch et al. | ............. | 370/468 |
| 6,154,643 A * | 11/2000 | Cox | ........................... | 455/406 |
| 6,469,982 B1 * | 10/2002 | Henrion et al. | ............. | 370/230 |
| 6,680,930 B2 * | 1/2004 | Newberg et al. | ............ | 370/348 |
| 6,751,477 B1 * | 6/2004 | Alperovich et al. | ......... | 455/560 |
| 7,072,295 B1 * | 7/2006 | Benson et al. | .............. | 370/230 |
| 2002/0051462 A1 * | 5/2002 | Ertel et al. | ................... | 370/442 |
| 2003/0084184 A1 * | 5/2003 | Eggleston et al. | ........... | 709/234 |

* cited by examiner

*Primary Examiner*—Andrew Lee (57) ABSTRACT

A way of managing bandwidth in a network supporting variable bit rate is provided. An apparatus is provided that comprises an interface to transmit data to a receiving device. The apparatus comprises a controller that is communicatively coupled to the interface, the controller to detect a bit rate change event and transmit a first portion of the data using reserved bandwidth and a second portion of the data using unreserved bandwidth in response to detecting the bit rate change event.

25 Claims, 5 Drawing Sheets

MANAGING BANDWIDTH IN NETWORK SUPPORTING VARIABLE BIT RATE

BACKGROUND

This invention relates generally to managing bandwidth in a network supporting variable bit rate.

A rapid and global acceptance of the Internet as a preferred communications medium has contributed to the proliferation of Wireless Local Access Networks (WLANs). WLANs are capable of providing users with a powerful and easy-to-use method of accessing the Internet, where one form of Internet traffic may be voice over Internet Protocol (VoIP), for example.

A WLAN is a flexible data communication system that can either replace or extend a wired LAN to provide added functionality. Using Radio Frequency (RF) technology, WLANs may transmit and receive data over the air, through walls, ceilings and even cement structures, without wired cabling. In one WLAN configuration, a wireless client may interface with an Access Point to access a wired local area network, for example.

When transmitting video, voice, and/or other high priority traffic over WLANs, bandwidth agreements are typically established between an Access Point (AP) and the wireless client. Bandwidth agreements generally provide a certain Quality of Service (QoS) that is typically required for constant bit rate applications, such as applications that transmit voice, audio, video, and/or other high priority traffic.

An AP of a WLAN may be capable of supporting multiple wireless clients substantially simultaneously by sharing the available bandwidth among the multiple wireless clients. WLANs may sometimes support dynamic bit rate connections such that, in response to certain rate change events, the bit rate between two communicating devices may be adjusted. An example of a bit rate change event may be an increased distance between the two communicating devices.

Typically, bandwidth agreements in WLANs that support dynamic bit rate connections are negotiated based on an assumed bit rate. If, however, the bit rate changes from the assumed bit rate, the existing bandwidth agreement may no longer be valid, thereby possibly interrupting the transfer of data. This interruption in data transfer may be problematic for applications that, for example, transmit voice, audio, video, and/or other high priority traffic.

Thus, there is a need to efficiently manage bandwidth in a network supporting variable bit rate.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION

Figure 1:
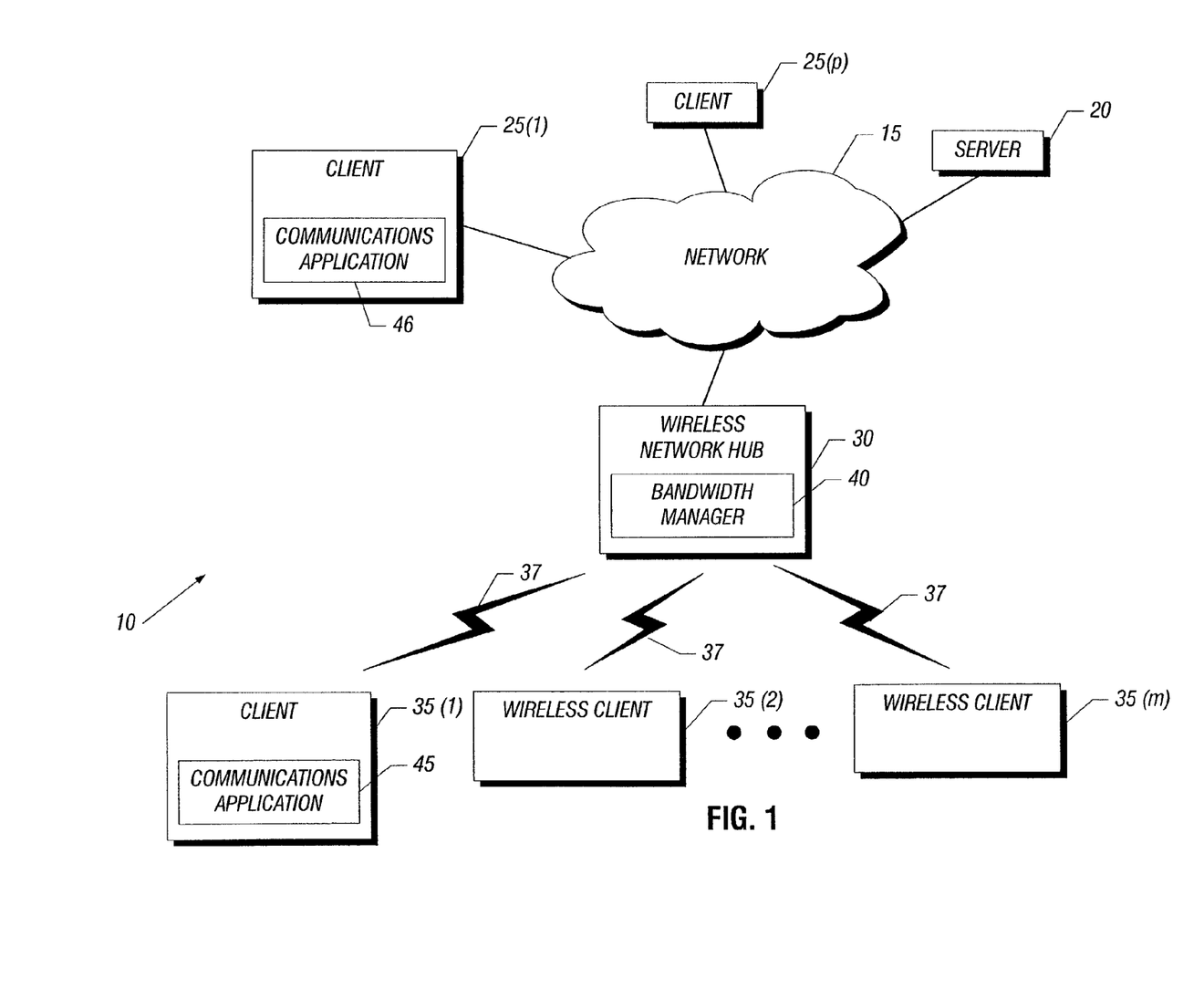
FIG. 1 is a stylized block diagram of a communications system, in accordance with one embodiment of the present invention.

Referring now to FIG. 1, a block diagram of a communications system 10 is shown in accordance with one embodiment of the present invention. In one embodiment, the communications system 10 includes a network 15, which may be a private network, such as a local area network, or a public network, such as the Internet. The network 15 may be a wired network. The communications system 10, in one embodiment, may include a server 20 and a plurality of clients 25(1-$p$) coupled to the network 15.

In one embodiment, the communication system 10 may include a wireless network hub 30, such as an Access Point, that serves as an interface between one or more wireless clients 35(1-$m$) and the network 15. In one embodiment, the wireless clients 35(1-$m$) may communicate with each other using the I.E.E.E 802.11a or 802.11b standard. The IEEE 802.11 family of standards (IEEE Standard 802.11 available from the Institute of Electrical and Electronics Engineers, New York, N.Y.) describes a standard for wireless LAN systems. It involves the use of 2.4 GHz Industrial, Scientific and Medical (ISM) or 5 GHz communication frequency bands.

The wireless clients 35(1-$m$) may include any processor-based systems capable of communicating over a wireless connection 37 (i.e., through the wireless network hub 30) with other network devices, such as the clients 25(1-$p$) and the wireless clients 35(1-$m$). Examples of wireless clients may include personal digital assistants, laptop computers, desktops, telephones, and other processor-based devices having the ability to communicate wirelessly using wireless network cards or other such circuitry.

In one embodiment, as described in more detail below, the wireless network hub 30 is able to support variable bit rate connections. That is, in response to a bit-rate changing event, the wireless network hub 30 may be able to maintain a network connection with the wireless clients 35(1-$m$), albeit at a reduced bit rate. In one embodiment, the wireless network hub 30 may support a number of different data rates starting at one megabit per second to up to 11 megabits per second. If a particular wireless client 35(1-$m$) is moved out of range of the wireless network hub 30 at 11 megabits per second, that wireless client 35(1-$m$) may, in one embodiment, still be able to communicate with the wireless network hub 30 by reducing the existing data rate. In one embodiment, a rate change event may be any change due to change in channel conditions or change in the quality of the wireless communications between the wireless network hub 30 and the wireless client 35(1-$m$).

As described below, one or more of the described embodiments enable the wireless clients 35(1-$m$) and wireless network hub 30 to communicate substantially seamlessly even after a change in the bit rate. As such, with the advent of one or more embodiments of the present invention, it may be possible to provide QoS enabled services suitable for delivering voice, video, audio, and/or other high priority traffic.

The wireless network hub 30, in one embodiment, includes a bandwidth manager 40 that manages the bandwidth for the wireless network hub 30 during communications with the wireless clients 35(1-$m$). The bandwidth manager 40 is described in more detail below. In another embodiment, the bandwidth manager 40 may be located in other wireless elements, such as the wireless client 35(1-$m$).

The users of wireless client 35(1) and the client 25(1), in one embodiment, may be able to engage in voice and/or video communications using communications application 45 and 46, as described in more detail below.

Figure 2:
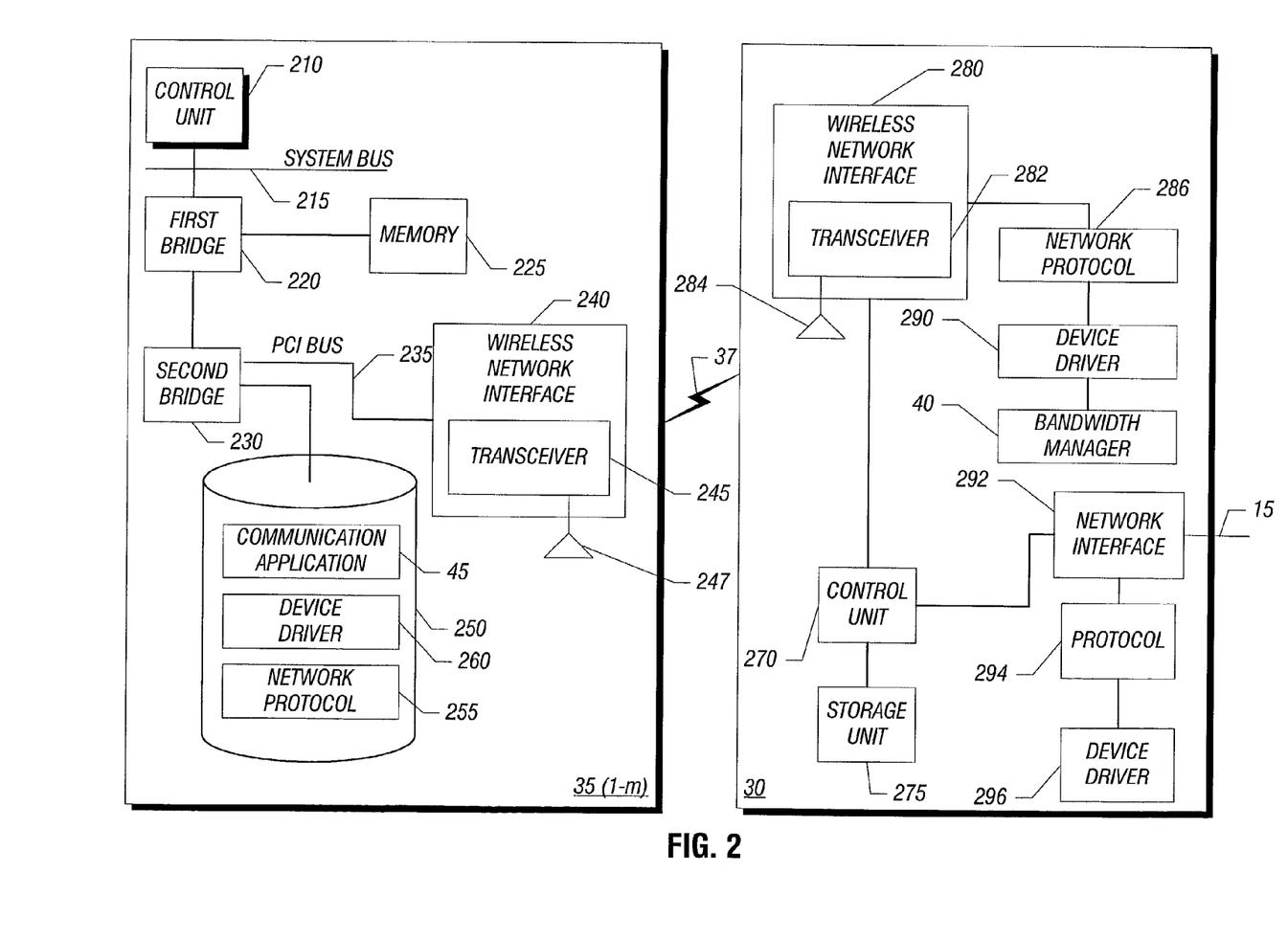
FIG. 2 is a block diagram of a wireless network hub and a wireless client that may be implemented in the communications system of FIG. 1, in accordance with one embodiment of the present invention.

Referring now to FIG. 2, a block diagram of the wireless client 35(1-m) and wireless network hub 30 is illustrated, in accordance with one embodiment of the present invention. The wireless client 35(1-m) may include a control unit 210 that is coupled to a system bus 215, in one embodiment. A first bridge 220 may be coupled to the system bus 215, and to a memory 225, in one embodiment.

The wireless client 35(1-m), in one embodiment, includes a second bridge 230 that may be coupled to the first bridge 220. In one embodiment, a Peripheral Component Interconnect (PCI) bus 235 couples a wireless network interface 240 to the second bridge 230. The wireless network interface 240 may include a transceiver 245 and an antenna 247. The wireless network interface 240 may be able to transmit and receive information to and from the wireless network hub 30 over the wireless link 37. In one embodiment, the wireless network interface may include a removable wireless network card that uses radio frequency to communicate with the wireless network hub 30.

The wireless client 35(1-m), in one embodiment, includes a storage unit 250 coupled to the second bridge 230. A network protocol 255 and a device driver 260 for the wireless network interface 240 may be installed on the wireless client 35(1-m), and may be stored in the storage unit 250. As mentioned earlier, the wireless client 35(1-m) in one embodiment, includes the communications application 45 stored in the storage unit 250. The communications application 45 may be a constant bit rate application that is capable of transmitting and receiving, for example, voice and/or video.

The wireless network hub 30, in one embodiment, includes a control unit 270 and a storage unit 275. The wireless network hub 30 may include a wireless network interface 280 having a transceiver 282 and an antenna 284. The wireless network hub 30 includes a network protocol 286 and device driver 290 for the wireless network interface 280, in one embodiment. The wireless network interface 280, in one embodiment, may be able of communicating with the wireless client 35(1-m) over the wireless link 37.

The wireless network hub 30, in one embodiment, includes a network interface 292 for interfacing with the network 15. The network interface 292 may have an associated protocol 294 and a device driver 296 installed on the wireless network hub 30. The wireless network hub 30, as mentioned earlier, may include the bandwidth manager 40.

One or more of the network protocols 286, 294, device drivers 290, 296, and the bandwidth manager 40 of the wireless network hub 30 may be stored in the storage unit 275 and, in one embodiment, executable on the control unit 270.

Figure 3:
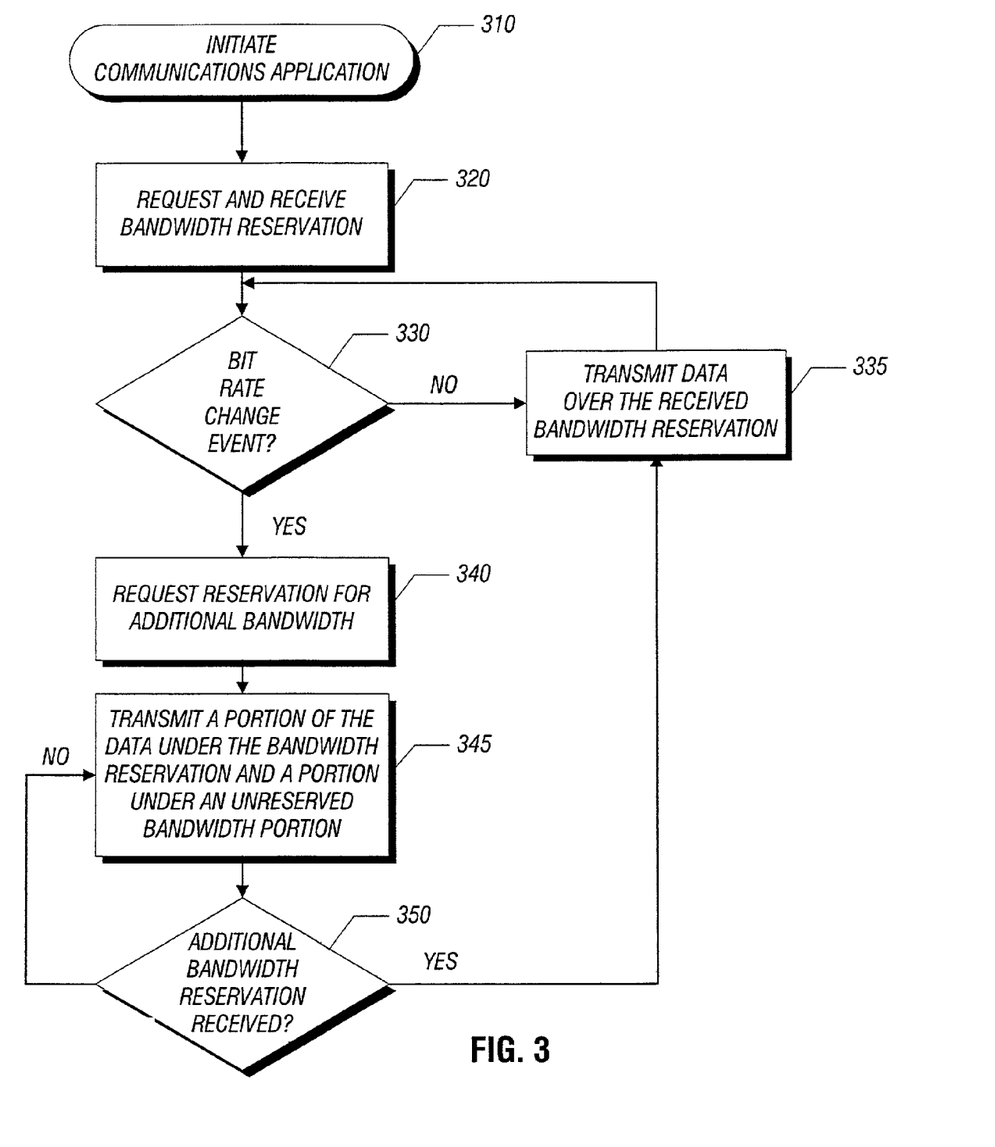
FIG. 3 is a flow diagram of a method that may be implemented in the communications system of FIG. 1, in accordance with one embodiment of the present invention.

Referring now to FIG. 3, a flow diagram of a method that may be implemented in the wireless client 35(1-m) is illustrated, in accordance with one embodiment of the present invention. For clarity and ease of illustration, the method of FIG. 3 is described in the context of the wireless client 35(1) being the transmitter and the wireless network hub 30 being the receiver. That is, in the illustrated embodiment, the communication application 45 of the wireless client 35(1-m) transmits data that is then received by the wireless network hub 30 and then delivered to the communications application 46 of the client 25(1) over the network 15. It should, however, be appreciated that either the wireless client 35(1) or wireless network hub 30 may be the transmitter. As such, some of the steps of the method of FIG. 3 may be implemented in other devices, such as the network wireless hub 30.

A user of the wireless client 35(1) initiates (at 310) the communications application 45, in one embodiment. As mentioned, the communications application 45 may be an application capable of transmitting or receiving voice and/or video data to and from a remote device, such as the client 25(1). In an alternative embodiment, the communications application 45 may transmit or receive audio to and from the communications application 46 of the client 25(1).

In order to establish a certain quality of service connection with the remote client 25(1), the communications application 45 may request and then receive (at 320) a bandwidth reservation in a manner described below. In one embodiment, because the communication between the client 25(1) and the wireless client 35(1) may be a two-way communication, a bandwidth reservation may be established in both directions (i.e., to and from the client 35(1)) of a network path. Moreover, a bandwidth reservation (sometimes also referred to as a "bandwidth agreement"), in one embodiment, may be established along each hop from the wireless client 35(1) and client 25(1). For example, in one embodiment, the wireless client 35(1) requests and receives a bandwidth reservation from the bandwidth manager 40 of the wireless network hub 30 for the wireless connection 37. The bandwidth reservation received by the wireless client 35(1) may be granted by the bandwidth manager 40 of the wireless network hub 30 for a given data bit rate.

The wireless client 35(1) detects (at 330), in one embodiment, if a bit rate change event has occurred. In one embodiment, the network protocol 255 for the wireless network interface 240 of the wireless client 35(1-m) may detect a bit rate change event. If no bit rate change is detected (at 330), the wireless client 35(1), in one embodiment, transmits (at 335) data over the received (at 320) bandwidth reservation. The wireless client 35(1) may continue to transmit data to the remote client 25(1) using the received bandwidth reservation in the absence of a bit rate change event.

If, however, the wireless client 35(1) detects (at 330) a bit rate change event desiring a requirement for a larger bandwidth reservation, then the wireless client 35(1), in one embodiment, requests (at 340) a reservation for additional bandwidth from the bandwidth manager 40 of the wireless network hub 30. In one embodiment, a bit rate change event may cause the wireless client 35(1) to transmit data at a reduced rate, thereby requiring additional bandwidth reservation to transmit the data. That is, the existing bandwidth reservation may be inadequate for data transmission at the reduced transmission rate. For this reason, additional bandwidth may be desired. In one embodiment, the wireless client 35(1) may request a new bandwidth reservation that is adequate to transmit data at a reduced rate, and, if granted, the wireless client 35(1) may cancel the earlier bandwidth reservation and then use the newly received bandwidth reservation for data transmission. In an alternate embodiment, the wireless client 35(1) may retain the original bandwidth reservation and request an additional bandwidth reservation to compensate for the reduced bit rate.

In the event the data is being transferred from the wireless network hub 30 to the wireless client 35(1), the wireless network hub 30 may request a reservation for additional bandwidth from its own bandwidth manager 40. Thus, in one embodiment, the bandwidth manager 40 of the wireless network hub 30 manages the bandwidth requests for inbound and outbound transfers.

The wireless client 35(1) transmits (at 345) a portion of the data being transmitted to the client 25(1) to the wireless network hub 30 under the received (at 320) bandwidth reservation and a portion under an unreserved bandwidth portion, as described in more detail below with respect to FIG. 4. The unreserved bandwidth portion may refer to a portion of the bandwidth or airtime for which no prior reservation is required.

The wireless client 35(1) determines (at 350) if the request for additional bandwidth reservation is received. If the bandwidth manager 40 of the wireless network hub 30 has not yet granted the additionally requested bandwidth, then, in one embodiment, the wireless client 35(1) continues to transmit (at 345) a portion of the data using the bandwidth reservation, while the other portion of the data over the unreserved portion. If, however, the bandwidth manager 40 grants the request for additional bandwidth, then the wireless client 35(1) transmits (at 335), in one embodiment, the data under the existing reservation and the additional available reservation. Thus, in one embodiment, the wireless client 35(1) may no longer have to use the unreserved bandwidth to transfer a portion of its data when the newly granted bandwidth reservation is adequate to support the data transfer even at the reduced rate.

Selected portions of the method of FIG. 3 may be implemented at one of a variety of levels in the wireless client 35(1) and/or wireless network hub 30. For example, selected steps of the method of FIG. 3 may be implemented at the network protocol level, device driver level, or at level between the application level and the device driver level. In some embodiments, one or more of the steps of the method of FIG. 3 may be implemented in the wireless network interface 240, 280 of the respective wireless clients 35(1-m) and wireless network hub 30.

Figure 4:
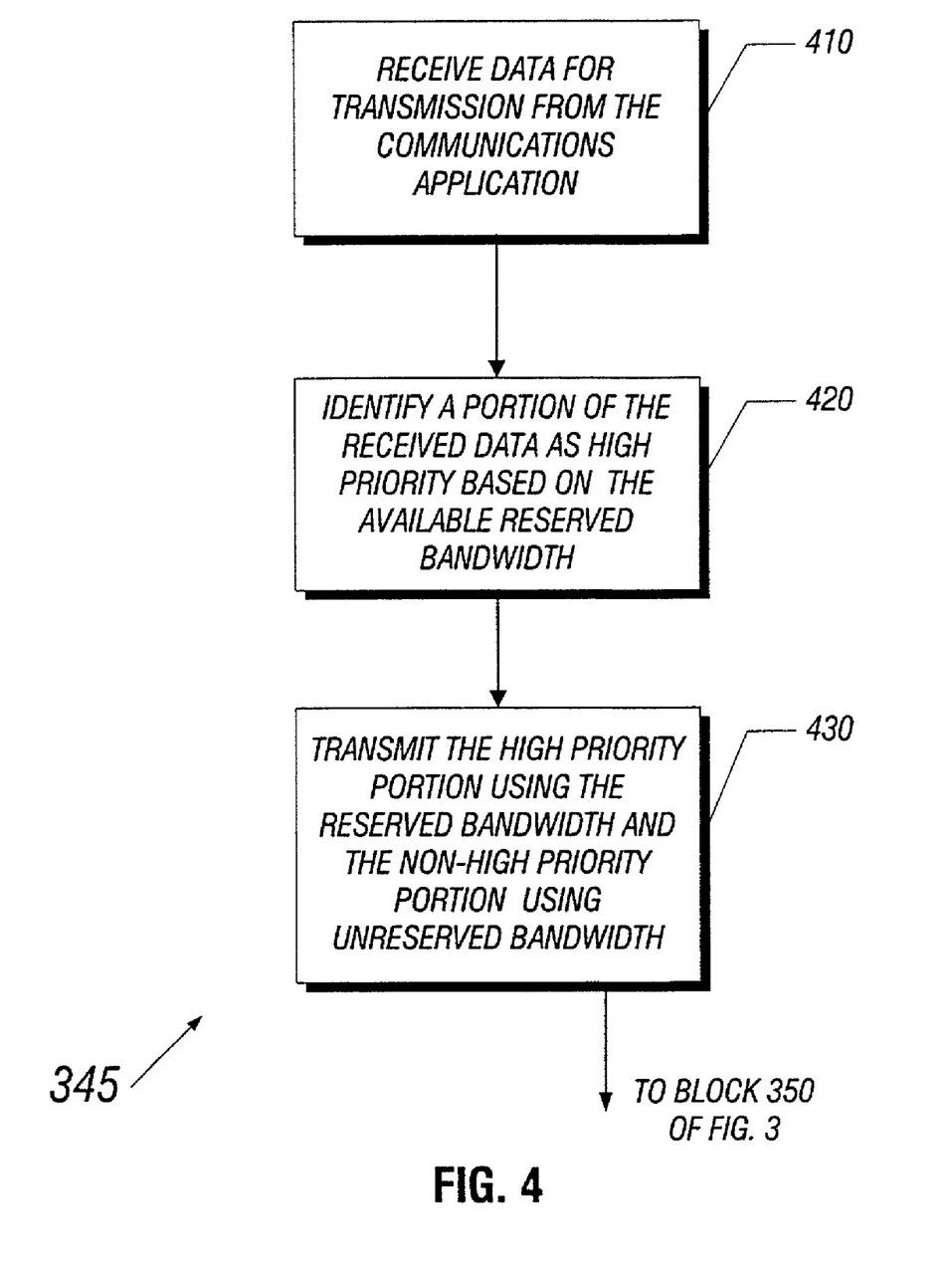
FIG. 4 is a flow diagram of an alternate embodiment of the method of FIG. 3.

Referring now to FIG. 4, a flow diagram of the block 345 of the method of FIG. 3 is illustrated, in accordance with one embodiment of the present invention. The wireless client 35(1), in one embodiment, receives (at 410) data for transmission from the communications application 45. The wireless client 35(1), in one embodiment, identifies (at 420) a portion of the received data as high priority based on the available reserved bandwidth.

The wireless client 35(1), in one embodiment, transmits (at 430) the high priority portion of data under the reserved bandwidth and transmits the remaining portion of the data over the unreserved portion of the bandwidth. In some instances, data transmitted over the unreserved portion of the bandwidth may or may not reach the wireless network hub 30, depending on the availability of bandwidth resources.

Figure 5:
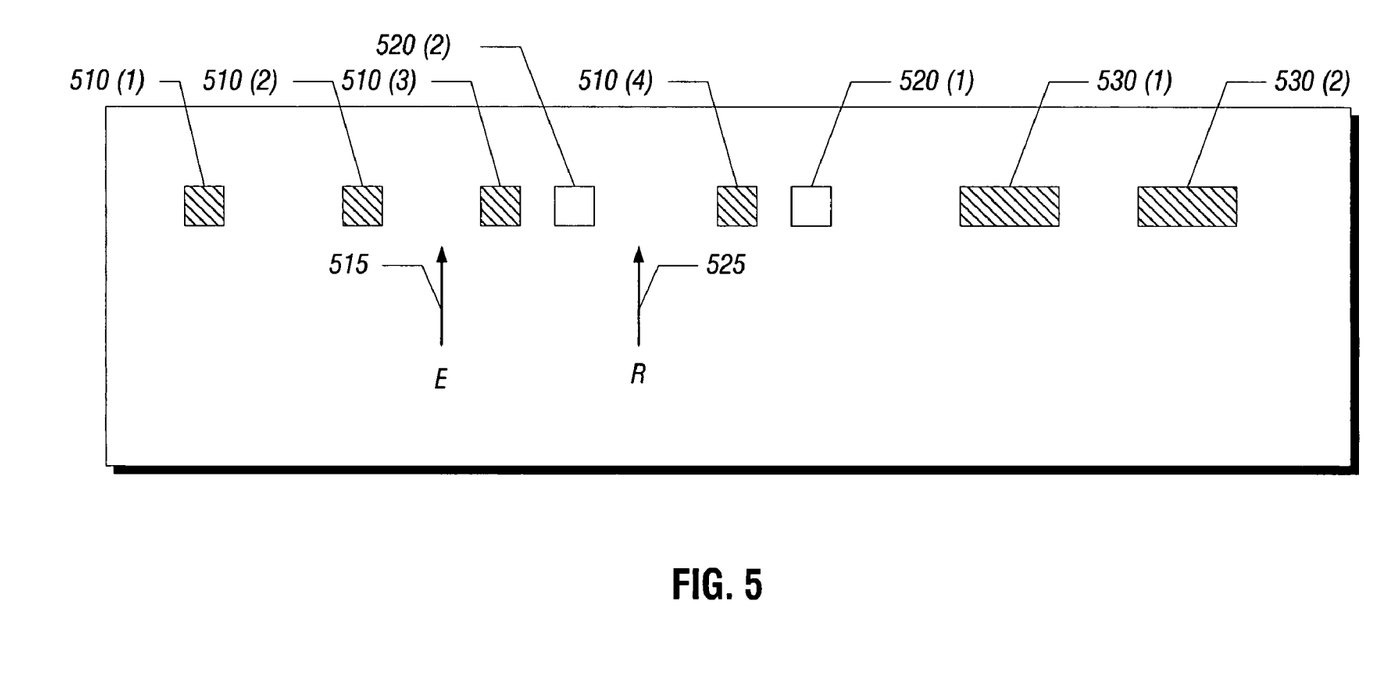
FIG. 5 is an illustration of data transmission between the wireless network hub and the wireless client of FIG. 2, in accordance with one embodiment of the present invention.

Referring now to FIG. 5, one illustration of data transmission between the wireless client 35(1) and the wireless network hub 30 is shown, in accordance with one embodiment of the present invention. FIG. 5 assumes that the wireless client 35(1) has a bandwidth reservation at some bit rate. Thus, in one embodiment, as long as the bit rate is sustained, the wireless client 35(1) may be successfully able to transmit data to the wireless network hub 30, as indicated by the blocks 510(1-2). However, an occurrence of a bit rate change event may cause the wireless client 35(1) to communicate with the wireless network hub 30 at a reduced transfer rate (i.e., a rate less than the previously used bit rate), in one embodiment.

An arrow 515 indicates that a bit rate change event has occurred, thereby resulting in a reduced transfer rate, in one embodiment. At the reduced transfer rate, the wireless client 35(1) may not be able transmit the desired data within the allocated bandwidth reservation. Thus, in response to the bit rate change event, the wireless client 35(1) may request the bandwidth manager 40 of the wireless network hub 30 for reservation for additional bandwidth to account for the reduced transfer bit rate.

In one embodiment, upon requesting for increased bandwidth, the wireless client 35(1) transmits a portion (indicated by the blocks 510(3-4)) of the data as high-priority using the allocated bandwidth reservation, and the remaining portion (indicated by the blocks 520(1-2)) of the data as low-priority using unreserved bandwidth. This process may continue until either all of the desired data has been transmitted by the wireless client 35(1), or until additional bandwidth has been renegotiated with the bandwidth manager 40 of the wireless network hub 30.

An arrow 525 indicates a successful negotiation for additional bandwidth. As a result, in one embodiment, the wireless client 35(1) transmits the data to the wireless network hub 30 using the negotiated bandwidth reservation, as indicated by the blocks 530(1-2). Once the additional bandwidth reservation is received, the wireless client 35(1) may transmit, in one embodiment, all of the data over the reserved bandwidth, without having to transmit a portion of the data over unreserved bandwidth. Using the bandwidth reservation to transmit data may be desirable since data transmitted over the unreserved bandwidth may not be successfully transmitted sometimes, particularly during peak traffic periods.

A "reserved bandwidth," in one embodiment, is bandwidth that is allocated to the wireless client 35(1-m) by the bandwidth manager 40 in response to a request for reserved bandwidth. An "unreserved bandwidth," in one embodiment, is a bandwidth that is available to the wireless client 35(1-m) for which no request for bandwidth is made.

The various system layers, routines, or modules may be executable control units (such as control units 210 and 270 (see FIG. 2)). Each control unit may include a microprocessor, a microcontroller, a processor card (including one or more microprocessors or controllers), or other control or computing devices. The storage units referred to in this discussion may include one or more machine-readable storage media for storing data and instructions. The storage media may include different forms or memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

What is claimed is:

1. An apparatus, comprising:
a wireless communications device containing an interface and a controller communicatively coupled to the interface, the device to:

request and receive a first reserved bandwidth for transferring data based on a pre-selected bit rate;

detect a bit rate change event and in response to detecting said event to transmit a first portion of the data using the first reserved bandwidth and a second portion of the data using unreserved bandwidth; and request a second reserved bandwidth for transferring the data.

2. The apparatus of claim 1, wherein the interface comprises an interface to transmit over a wireless medium.

3. The apparatus of claim 1, wherein the interface comprises a wireless network card.

4. The apparatus of claim 1, wherein the device is to receive the second reserved bandwidth.

5. The apparatus of claim 4, wherein the device is to transmit the first and second portions of the data using the second reserved bandwidth.

6. The apparatus of claim 1, wherein the bit rate change event is a reduction in bit rate, wherein the second reserved bandwidth is to compensate for the reduced bit rate.

7. The apparatus of claim 1, wherein the controller is to designate the first portion of the data as high priority and the second portion of the data as low priority.

8. The apparatus of claim 1, wherein the controller is to determine the bit rate change event by determining a drop in quality of service during communications with the receiving device.

9. An article comprising one or more machine-readable storage media containing instructions that when executed by at least one processor enable a wireless communications device to:

request and receive a first bandwidth reservation;

transfer data using the first bandwidth reservation;

detect a reduced transfer rate;

transmit a first portion of the data using the first bandwidth reservation and a second portion of the data using unreserved bandwidth in response to detecting the reduced transfer rate; and request a second bandwidth reservation in response to detecting the reduced transfer rate.

10. The article of claim 9, wherein the instructions when executed enable the device to receive the second bandwidth reservation.

11. The article of claim 10, wherein the instructions when executed enable the device to transmit the first and second portion of the data using the first bandwidth reservation and the second bandwidth reservation.

12. The article of claim 10, wherein the instructions when executed enable the device to transmit the first portion and the second portion of the data using the second bandwidth reservation.

13. The article of claim 9, wherein the instructions when executed enable the device to detect the reduced rate based on a change in a transmission channel condition.

14. The article of claim 9, wherein the instructions when executed enable the device to transmit a high priority data using the first bandwidth reservation and a low priority data using the unreserved bandwidth in response to detecting the reduced transfer rate.

15. A method performed by a wireless communications device, the method comprising:

requesting and receiving a first bandwidth reservation for transferring data at a pre-selected bit rate;

transmitting a first portion of the data over the first bandwidth reservation and a second portion of the data over unreserved bandwidth in response to determining that a current bit rate is less than the pre-selected bit rate; and requesting a second bandwidth reservation for transferring the data.

16. The method of claim 15, further comprising receiving the second bandwidth reservation and continuing said transferring data with the second bandwidth reservation.

17. The method of claim 16, further comprising transmitting the first portion and the second portion of the data using the first bandwidth reservation and the second bandwidth reservation.

18. The method of claim 16, further comprising transmitting the first portion and the second portion of the data over the second bandwidth reservation.

19. The method of claim 15, comprising receiving the first bandwidth reservation for a wireless link.

20. A system, comprising:

a client device to communicate with a wireless network hub in a wireless network, wherein the client device is to:

transmit data using a prior bandwidth agreement with the wireless network hub;

detect a bit rate change event and transmit a first portion of the data under the prior bandwidth agreement and a second portion of the data not under any bandwidth agreement in response to detecting the bit rate change event; and request a new bandwidth agreement with the wireless network hub in response to said detecting the bit rate change event.

21. The system of claim 20, wherein the client is a wireless client.

22. The system of claim 21, wherein the wireless client comprises a wireless network interface.

23. The system of claim 20, wherein the wireless network hub is an access point.

24. The system of claim 23, wherein the wireless network hub serves as an interface between a wireless network and a wired network.

25. The system of claim 20, wherein the wireless client device is further to receive the new bandwidth agreement from the wireless network hub and transmit the first and second portions under the new bandwidth agreement.

* * * * *

UNITED STATES PATENT AND TRADEMARK OFFICE
CERTIFICATE OF CORRECTION

PATENT NO.        : 7,623,496 B2
APPLICATION NO. : 09/841657
DATED             : November 24, 2009
INVENTOR(S)       : Duncan M. Kitchin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2790 days.

Signed and Sealed this

Twenty-sixth Day of October, 2010

David J. Kappos
*Director of the United States Patent and Trademark Office*